ately separate the sections to interrupt the torque transmitting function. Novel means are provided to yieldably retain the sections in operative relationship including an angular pitch on the interengaging torque transmitting surfaces and a torque rod secured at its ends to the shaft sections, initial torque applied to such rod tending to rotate said sections to urge said torque transmitting surfaces toward one another. Relative rotary movement of said sections in a direction opposed to the designed torque transmitting direction increases the torque applied to said torque rod, causes relative axial separation of the sections, and interrupts the transmission of power by the shaft. The shaft may be restored to operative condition by again imparting relative rotary movement to the sections to initially torque the rod and move the sections into abutting relationship.

United States Patent

[11] 3,536,174

[72] Inventor  John E. Vance
              Scottsdale, Arizona
[21] Appl. No. 766,458
[22] Filed     Oct. 10, 1968
[45] Patented  Oct. 27, 1970
[73] Assignee  The Garrett Corporation
               Los Angeles, California
               a corporation of California

[54] SAFETY DECOUPLER SHAFT
     11 Claims, 7 Drawing Figs.
[52] U.S. Cl. .................................. 192/56,
                                    192/46, 287/103
[51] Int. Cl. ................................. F16d 43/20
[50] Field of Search ........................ 192/46, 55,
                         56, 150, 67; 64/14, 28; 287/103, 104

[56]            References Cited
            UNITED STATES PATENTS
2,936,625  5/1960   Heiseler ................ 287/104X
2,964,931  12/1962  Sorenson ............... 64/28
3,269,498  8/1966   Hoenig et al. .......... 192/56

Primary Examiner—Allan D. Herrmann
Attorneys—Herschel C. Omohundro and John N. Hazelwood ABSTRACT: The subject decoupler shaft has first and second sections with complemental ends disposed in abutting relationship, such ends having interengaging surfaces operative, when the first section is rotated in one direction or the second section is rotated in the opposite direction, to transmit torque, said abutting ends also having cam surfaces which serve, when the order of rotation of the shaft sections is reversed, to axially Patented Oct. 27, 1970

INVENTOR.
JOHN E. VANCE

BY

*Herschel C. Omohundro*

ATTORNEY

Patented Oct. 27, 1970

INVENTOR.
JOHN E. VANCE

BY
Herschel C. Omohundro
ATTORNEY 3,536,174

SAFETY DECOUPLER SHAFT

SUMMARY

This invention relates broadly to safety devices and more generally to devices employed between driving and driven elements to prevent damage to one or the other upon faulty operation of either. Still more specifically, the invention is directed to a reversible shear output shaft designed for use between a starting motor and an engine such as a gas turbine engine. Many devices have previously been provided for this purpose, but there have been objections to all of them. Such devices have failed to function in the manner intended, thus permitting the driving or driven device to damage the other and cause delay, expensive repair, and/or replacement of parts. The previously proposed devices have been complicated and required constant care or frequent servicing by skilled workmen.

An object of this invention is to provide a safety decoupler shaft for transmitting motion from a starter to an engine which will avoid the above objections by being simple, have a minimum number of parts, and be foolproof yet positive in operation.

It is an object of this invention to provide a decoupler shaft having a plurality of sections which may be connected and serve to transmit power from one device to another during normal operation, but upon the occurence of an abnormal condition will separate to prevent the transmission of power, the sections being so constructed that the shaft can readily be restored to power transmitting condition.

Another object of the invention is to provide a decoupler shaft which will function to transmit torque from a starter to an engine under usual conditions, but in the event of an emergency, such as might require a force which would damage the engine, a predetermined part of the shaft will fracture to prevent the transmission of such excessive force.

Still another object of the invention is to provide a decoupler shaft which will prevent the transmission of reverse torque from the engine to the starter which might damage the latter, the shaft being so constructed that parts thereof will separate and move out of torque transmitting relation where they will remain until returned to operative condition by personnel with no special skill requirements.

A further object of the invention is to provide a decoupler shaft composed of two sections having complemental abutting ends shaped to provide a torque transmitting connection when either section is rotated in a predetermined direction and to separate axially when either section is rotated in the opposite direction, means being provided in connection with the sections to tend to urge them into the torque transmitting relation, but which will upon the occurrence of certain events permit axial separation of the sections and consequent interruption of torque transmission, the means being so constructed that it will not be destroyed by the section separating operation but may be used repeatedly.

A still further object of the invention is to provide the decoupler shaft mentioned in the preceding paragraph with a novel means for urging the sections into assembled torque transmitting relation, such means including the inclination of torque transmitting surfaces to cause the sections to tend to more firmly engage one another upon relative rotation in one direction, and a torque rod connected at its ends with the sections and initially stressed to tend to cause such relative rotation between the sections, the connection between the torque rod and the sections being such as to facilitate assembly of the shaft parts and permit limited axial separation of the sections in a decoupling operation without the destruction of any part, reassembly being easily accomplished.

Other objects will be apparent upon a perusal of the following description of one embodiment of the invention which has been shown in detail in the accompanying drawings.

IN THE DRAWINGS

DESCRIPTION

More particular reference to the drawings will show that the decoupler shaft formed in accordance with the present invention includes first and second sections 10 and 11, which are provided with complemental ends 12 and 13 adapted for abutting relationship. These sections are also formed with splines 14 and 15 to connect the decoupler shaft with driving and driven elements such as starter and engine components. The splines provide positive torque transmitting connections with the starter and engine components, but permit some axial movement. Any other suitable form of connection with the starter and engine could be employed.

Figure 6:
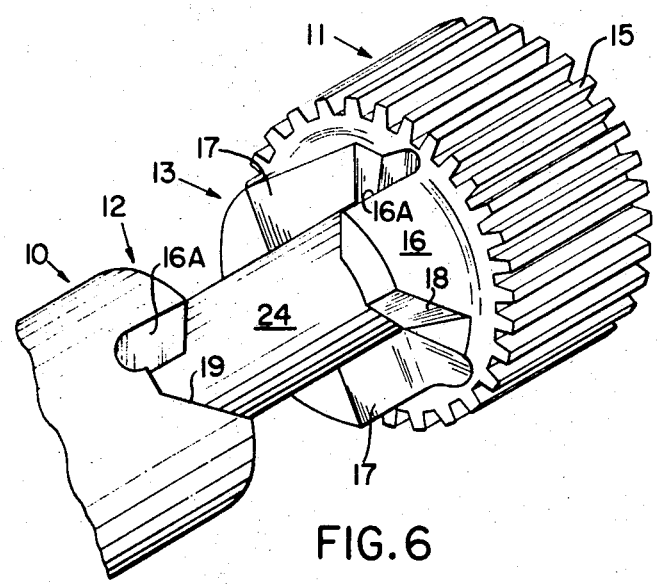
FIG. 6 is a perspective view of the complemental ends of the shaft sections separated to show the lug and groove arrangement.
Figure 7:
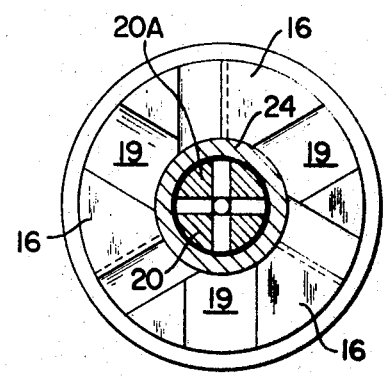
FIG. 7 is a vertical transverse sectional view taken through the shaft on the plane indicated by the line VII–VII of FIG. 4.

The complemental abutting ends of the shaft sections 10 and 11 are formed as shown in FIG. 6 with interfitting lugs 16 and recesses 17 (three in number, in this instance) to effect a driving or torque transmitting connection, the lugs having interengaging surfaces 16A to transmit torque when the sections are rotated in predetermined directions and other interengaging cam surfaces 18 and 19, which tend to axially separate the sections when they are rotated in directions reverse to the predetermined directions. Surfaces 16A are slightly inclined relative to the axis of the shaft to cause the sections to tend to more firmly engage one another when rotated in the said predetermined directions.

Figure 1:
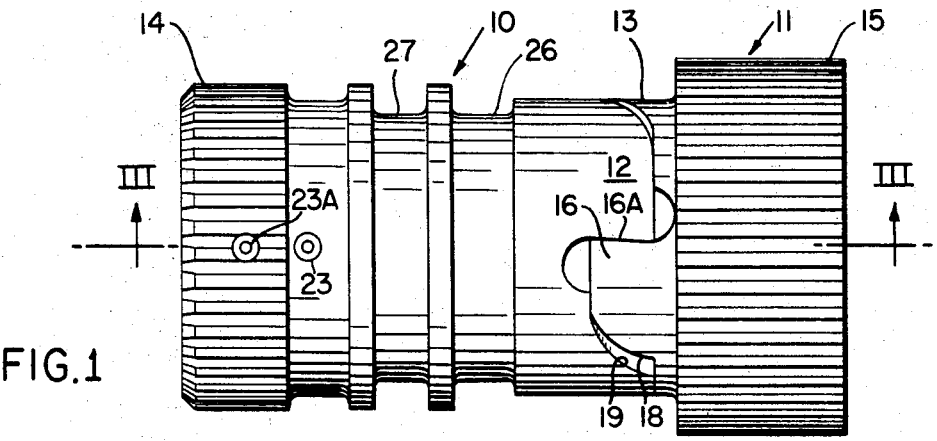
FIG. 1 is a side elevational view of a decoupler shaft formed in accordance with the present invention, the shaft being shown in fully assembled condition and ready for operation.
Figure 2:
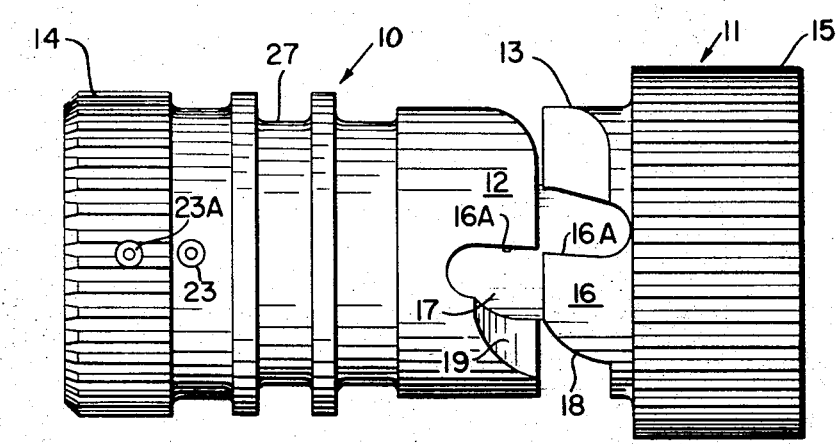
FIG. 2 is a similar view of the shaft shown in FIG. 1 after a decoupling operation has occurred.
Figure 3:
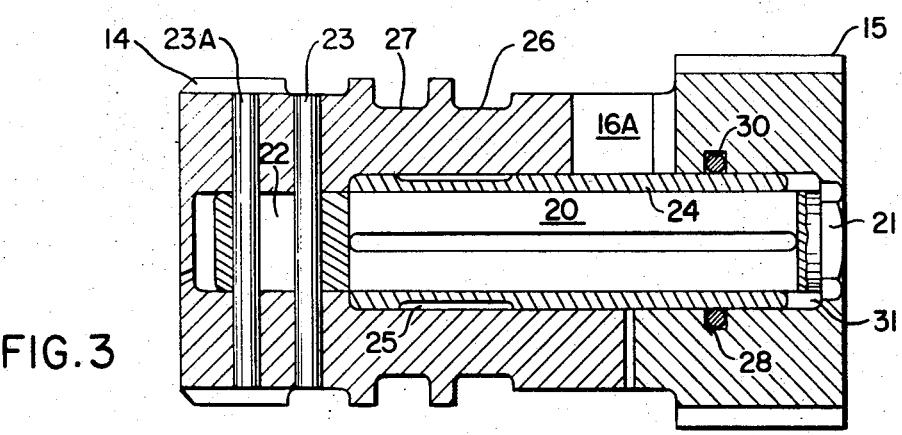
FIG. 3 is an axial sectional view taken through the assembled shaft on the plane indicated by the line III–III of FIG. 1.

To yieldably resist axial separation of the sections, a novel means is provided, this means including a torque rod 20, which is arranged to extend axially through the shaft sections. This torque rod is provided at one end with a hexagonal head 21 arranged to fit a similarly shaped opening in shaft section 11. The other end of the torque rod is provided with an axial slot 22 extending transversely through the rod, this slot being of a predetermined length and formed to receive a pair of retaining pins 23 and 23A extending through shaft section 10. Section 10 is also provided with a tubular element 24 which surrounds the torque rod and extends partially into shaft section 11. The tube is brazed to the section 10 to form an integral part thereof. As shown in FIG. 3, the tube is relieved, as at 25, to limit the extent of the brazing connection between the tube and section 10. This relieved portion registers with a groove 26 formed in section 10 to provide a frangible region to protect the engine should undue torque be transmitted thereto by the starter.

As pointed out in the objects, if the engine should bind for some reason and the starter exert excess torque, the shaft will shear at the groove 26 to prevent damage to the starter or engine. The shaft is also provided with another groove 27 for the reception of a sealing ring.

Shaft section 11 has an internal groove 28 for the reception of a split ring 30, this ring being resilient and tending to contract. It will be noted from FIG. 3 that the relation between the length of the tube 24 and the torque rod 20 is such that when these parts are properly assembled with shaft section 10, a recess 31 is provided between the end of the tube and the head 21 of the torque rod. This recess permits the ring 30 to contract when the shaft sections 10 and 11 are axially separated in a decoupling operation, the ring then being disposed partially in the recess 31 and groove 30 of shaft section 11 to prevent further relative axial movement of these shaft sections.

Figure 4:
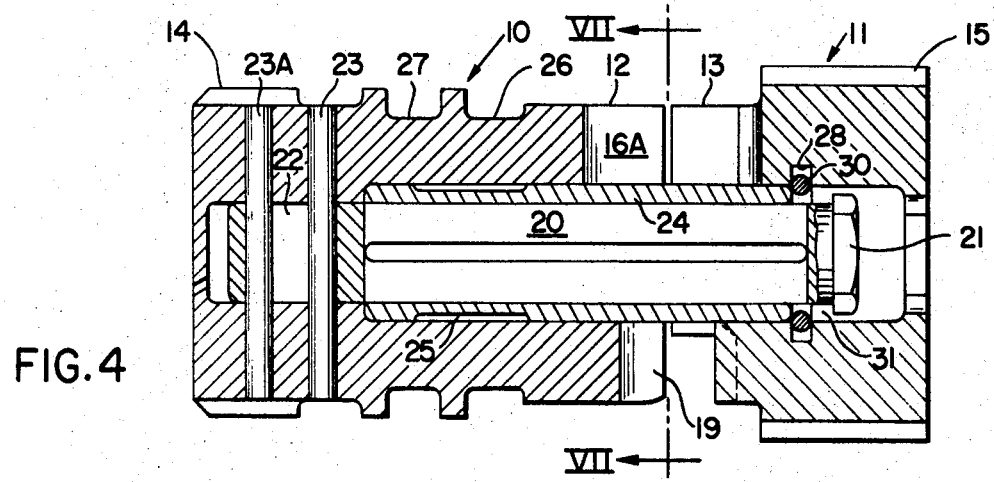
FIG. 4 is a similar view of the shaft following a decoupling operation.

It will be noted from FIG. 4 that after a decoupling operation has taken place, the head 21 of the torque rod will be withdrawn from the hexagonal opening in shaft section 11. The shaft sections may then rotate relative to one another without any motion transmission therebetween. Because of the location of the ring 30 in the recess 31 and groove 28, the sections may not readily be moved into abutting relationship. The resiliency of ring 30 will, however, permit the shaft sections to be moved toward one another in the reassembly of the shaft for a subsequent operation. It will be necessary, in such reassembly, to position the head 21 of the torque rod in the hexagonal opening in shaft section 11 and then rotate the sections relative to one another to align the lugs 16 with the recesses 17. This relative rotation initially applies torsional force to the torque rod which, after the sections are moved into abutting relationship, exerts force on such sections to retain the surfaces 16A in torque transmitting engagement. This engagement also tends to prevent axial separation of the shaft sections. It will be obvious that should a force be applied to the shaft sections which would move cam surfaces 18 and 19 toward one another, additional torque will be applied to the torque rod to yieldably resist such movement. If the movement is continued, the cam surfaces 18 and 19 will cause relative axial separation of the shaft sections and an interruption to the torque transmitting operation as above described. This relative axial movement may take place due to the axially slidable connection between the head 21 of the torque rod and the shaft section 11. As previously pointed out, the parts can be returned to operative position by relative rotary movement to align the lugs 16 with the recesses 17 in the abutting ends.

The torque rod 20, selected for illustration, is formed with a plurality of torsion sections 20A by slotting the rod 20 axially a predetermined distance. In the form of the invention illustrated, two axial slots disposed 90° from one another are employed. This arrangement provides four torsion segments 20A. Other slot arrangements could be provided, if desired. Optionally, a single element torque rod may be used. (Selection of the number of elements depends upon the torsional stress limit which is a function of amount of rotation, torque load desired, and available length and diameter.)

Figure 5:
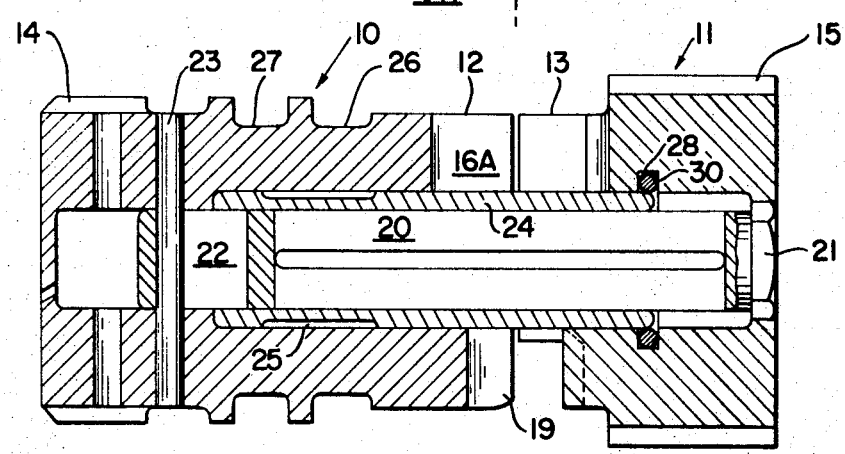
FIG. 5 is an axial sectional view taken through the shaft showing the parts at one stage of the assembly process.

The use of dual retaining pins 23 and 23A facilitates the initial assembly and subsequent reassembly of the elements. Reference to FIG. 5 shows the parts in an initial stage of assembly and in the process of reassembly. At this time, the head of the torque rod 20 is disposed in the hexagonal opening in shaft section 11. The rod is at this time positioned in section 10 with the slot 22 in the rod in registration with a first transverse opening in section 10. The first retaining pin 23 may then be inserted in the opening and will extend through the slot 22 in the torque rod. Thereafter, the shaft sections are rotated relative to one another to align the lugs 16 with the recesses 17 on the complemental abutting ends and the sections moved to dispose the lugs in the recesses. As previously pointed out, the relative rotary movement will apply torque to rod 20. The second retaining pin 23A may then be inserted in its respective opening in section 10 and the slot 22 in rod 20. The shaft will then be in condition for operation. When the shaft is decoupled, section 11 will move on the tube 24 until lugs 16 are disengaged and ring 30 snaps into recess 31. Section 11 may then rotate freely around the axis of the tube 24.

To restore the parts to operative relation, it will be necessary to remove retaining pin 23A, slide torque rod 20 axially to position the head 21 in the hexagonal opening in shaft section 11, then apply torque to the rod 20 by relatively rotating the sections to permit the lugs 16 on the complemental abutting ends to enter the recesses 17. Retaining pin 23A is then reinserted into the opening in section 10 and the slot 22 in rod 20, as before. The outer ends of the torque rod and section 11 may be provided with index lines to show their proper relative positions.

I claim:
1. A safety decoupler shaft, comprising:
   a. first and second shaft sections having complemental abutting ends shaped to provide a torque transmitting engagement when said first section is rotated in a predetermined direction and said second section is rotated opposite to said predetermined direction, said abutting ends also having interacting surfaces operative to axially separate said sections when said second section is rotated in said predetermined direction and said first section is rotated in the opposite direction, said sections being formed for motion transmitting connection with driving and driven elements; and
   b. means yieldably retaining said sections against axial separation, said means having a rod which is initially provided with a predetermined degree of torsional force to urge said sections toward said torque transmitting engagement, said rod being engaged with said sections and retained against rotation relative thereto.

2. The decoupler shaft of claim 1 in which the complemental butting ends of said shaft sections have interengaging surfaces responsive to torque in a predetermined direction to urge said sections into firmer engagement.

3. The decoupler shaft of claim 2 in which the rod of said means for retaining the shaft sections against axial separation is provided with a plurality of axially extending torsion segments.

4. The decoupler shaft of claim 2 in which the rod of said means for retaining the shaft sections against axial separation has longitudinal slots to provide a plurality of axially extending torsion segments.

5. The decoupler shaft of claim 4 in which the rod of said means for retaining the shaft sections against axial separation has a polygonal head disposed in a similarly shaped opening in one of said shaft sections to transmit torque from such section to said rod in response to relative rotary movement between said shaft section.

6. The decoupler shaft of claim 5 in which said rod has a slot adjacent the end opposite the headed end for the reception of retaining pin means carried by the adjacent shaft section to retain said shaft section and rod against relative rotation.

7. The decoupler shaft of claim 6 in which the retaining pin means comprises a pair of pins extending transversely through the slot in said rod and the adjacent shaft section, said pins being spaced axially of said shaft section.

8. The decoupler shaft of Claim 6 in which the relation between the lengths and locations of said slot, said torque rod and said shaft sections is such that said shaft sections can be initially assembled with the headed end of said torque rod in said similarly shaped opening and a part of said retaining pin means in the slot in said torque rod and adjacent shaft section, said shaft sections being disposed with said complemental ends separated, relative rotary movement of said shaft sections in a predetermined direction then serving to apply torque to said torque rod and permit relative axial movement of said shaft sections into abutting relationship, another part of said retaining pin means then being received by said slot and adjacent shaft section to retain said decoupler shaft in assembled relation.

9. The decoupler shaft of claim 6 in which said first shaft section has a tube secured therein to serve as a pilot guide for the second shaft section.

10. The decoupler shaft of claim 9 in which said second shaft section has an internal recess and a resilient ring disposed therein, the resiliency of said ring causing it to contract and engage an end portion of said tube to tend to resist movement of the latter into said second shaft section.

11. The decoupler shaft of claim 10 in which the relative lengths of said tube and said rod are such that a space is provided between the head of the rod and the end of said tube for the reception of a part of said ring upon predetermined relative axial movement of said shaft sections, said ring then tending to prevent further relative axial movement of said shaft sections.